(12) United States Patent
Ryu et al.

(10) Patent No.: US 12,490,191 B2
(45) Date of Patent: Dec. 2, 2025

(54) DORMANCY INDICATION IN SIDELINK COMMUNICATION SYSTEMS

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Juan Montojo, San Diego, CA (US); Jing Sun, San Diego, CA (US); Peter Gaal, San Diego, CA (US); Xiaoxia Zhang, San Diego, CA (US); Ozcan Ozturk, San Diego, CA (US)

( * ) Notice: Subject to any disclaimer, the term of this patent is extended or adjusted under 35 U.S.C. 154(b) by 156 days.

(21) Appl. No.: 17/485,058

(22) Filed: Sep. 24, 2021

(65) Prior Publication Data
US 2022/0104135 A1    Mar. 31, 2022

Related U.S. Application Data

(60) Provisional application No. 63/084,988, filed on Sep. 29, 2020, provisional application No. 63/084,973, filed on Sep. 29, 2020.

(51) Int. Cl.
*H04L 5/00* (2006.01)
*H04W 52/02* (2009.01)
*H04W 72/23* (2023.01)

(52) U.S. Cl.
CPC ....... *H04W 52/0235* (2013.01); *H04L 5/0055* (2013.01); *H04L 5/0098* (2013.01); *H04W 72/23* (2023.01)

(58) Field of Classification Search
None
See application file for complete search history.

(56) References Cited

U.S. PATENT DOCUMENTS

2014/0247802 A1* 9/2014 Wijting ............. H04W 72/0453
370/329
2014/0307586 A1* 10/2014 Zhang ................... H04W 88/04
370/254

(Continued)

FOREIGN PATENT DOCUMENTS

CN       109246659 A    1/2019

OTHER PUBLICATIONS

Huawei (Rapporteur): "Summary of [99#48] [eV2X] Selection of Tx Carriers", 3GPP TSG-RAN WG2 Meeting #99bis, 3GPP Draft, R2-1710089 Summary of [99#48] [EV2X] Selection of TX Carriers, 3rd Generation Partnership Project (3GPP), Mobile Competence Centre, 650, Route Des Lucioles, F-06921 Sophia-Antipolis Cedex, vol. RAN WG2, No. Prague, Czech Republic, Oct. 9, 2017-Oct. 13, 2017, 26 Pages, Sep. 28, 2017 (Sep. 28, 2017), XP051354200, Retrieved from the Internet: URL: http://www.3gpp.org/ftp/tsg_ran/WG2_RL2/TSGR2_99bis/Docs/ [retrieved on Sep. 28, 2017] p. 18, line 34-p. 20, line 4.

(Continued)

*Primary Examiner* — Abdelillah Elmejjarmi

(57) ABSTRACT

Certain aspects of the present disclosure provide techniques for signaling a user equipment (UE) to put a sidelink (SL) component carrier (CC) into dormancy or take the SL CC out of dormancy, such as mode 1 or mode 2 sidelink communications. In one example, a method performed by a UE includes receiving an indication to put a first CC into dormancy; and putting an SL CC into a dormant state in response to the indication. In another example, a method includes transmitting an indication that the first UE will put an SL CC into a dormant state; and receiving an acknowledgment (ACK) of the indication.

17 Claims, 15 Drawing Sheets

(56) References Cited

U.S. PATENT DOCUMENTS

| | | | |
|---|---|---|---|
| 2019/0028219 A1* | 1/2019 | Lim | H04L 5/001 |
| 2019/0306911 A1* | 10/2019 | Hahn | H04W 72/0453 |
| 2020/0053675 A1* | 2/2020 | Khoryaev | H04L 5/001 |
| 2021/0176030 A1* | 6/2021 | Tsai | H04W 76/27 |
| 2022/0330156 A1* | 10/2022 | Zhou | H04W 72/23 |
| 2023/0171792 A1* | 6/2023 | Sun | H04W 72/02 370/329 |
| 2023/0247693 A1* | 8/2023 | Zhang | H04W 72/0453 370/329 |

OTHER PUBLICATIONS

International Search Report and Written Opinion—PCT/US2021/052233—ISA/EPO—Jan. 7, 2022.
ZTE: "Discussion on Carrier Selection in PC5 CA", 3GPP TSG-RAN WG2 Meeting #99bis, 3GPP Draft, R2-1711011 Discussion on Carrer Selection in PC5 CA, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, 4 Pages, Oct. 8, 2017 (Oct. 8, 2017), XP051343021, Retrieved from the Internet: URL: http://www.3gpp.org/ftp/Meetings_3GPP_SYNC/RAN2/Docs/ [retrieved on Oct. 8, 2017] paragraph [02.3].

* cited by examiner

DORMANCY INDICATION IN SIDELINK COMMUNICATION SYSTEMS

CROSS-REFERENCE TO RELATED APPLICATIONS

This application claims benefits of and priority to U.S. Provisional Patent Applications No. 63/084,973 and No. 63/084,988, both filed on Sep. 29, 2020, both of which are assigned to the assignee hereof and herein incorporated by reference in their entirety as if fully set forth below and for all applicable purposes.

INTRODUCTION

Field

Aspects of the present disclosure relate to wireless communications, and more particularly, to techniques for signaling a user equipment (UE) to put a sidelink (SL) component carrier (CC) into dormancy or take the SL CC out of dormancy.

Background

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communications and reduced power consumption by UEs.

Certain aspects of the subject matter described in this disclosure can be implemented in a method for wireless communication by a user equipment (UE). The method generally includes receiving an indication to put a first component carrier (CC) into dormancy; and putting a sidelink (SL) CC into a dormant state in response to the indication.

Certain aspects of the subject matter described in this disclosure can be implemented in a method for wireless communication by a base station (BS). The method generally includes transmitting an indication to a UE to put a first CC into dormancy; and determining that the UE put a SL CC into a dormant state in response to the indication.

Certain aspects of the subject matter described in this disclosure can be implemented in a method for wireless communication by a first UE. The method generally includes transmitting an indication that the first UE will put a SL CC into a dormant state; and receiving an acknowledgment (ACK) of the indication.

Certain aspects of the subject matter described in this disclosure can be implemented in a method for wireless communication by a first UE. The method generally includes receiving an indication that a second UE will put a SL CC into a dormant state; and transmitting an ACK of the indication.

Certain aspects of the subject matter described in this disclosure can be implemented in a method for wireless communication by a BS. The method generally includes receiving an indication that a first UE will put a SL CC into a dormant state; and transmitting an ACK of the indication.

Aspects of the present disclosure provide means for, apparatus, processors, and computer-readable mediums for performing the methods described herein.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
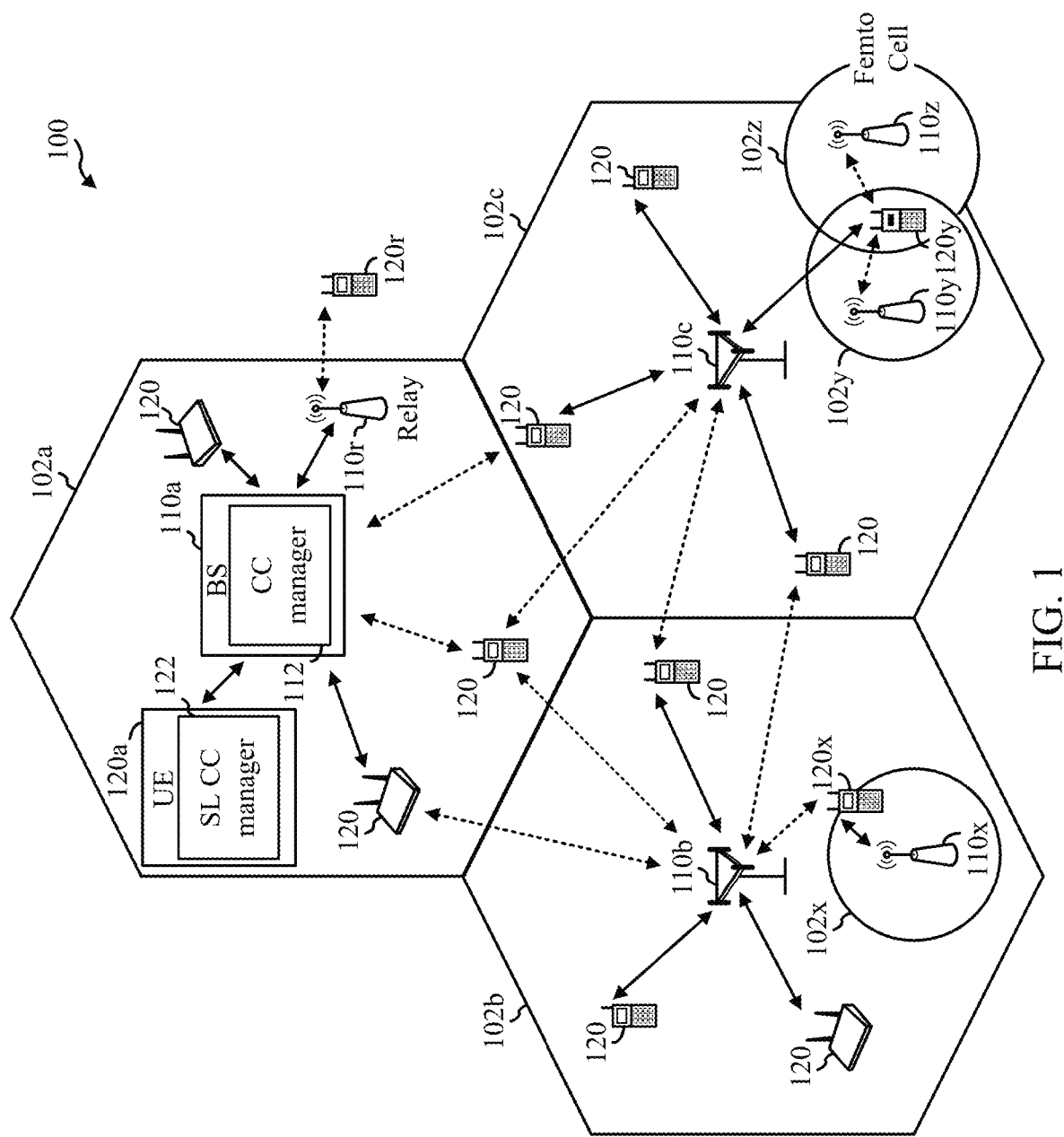
FIG. 1 is a block diagram conceptually illustrating an example wireless communication network, in accordance with certain aspects of the present disclosure.
Figure 1:
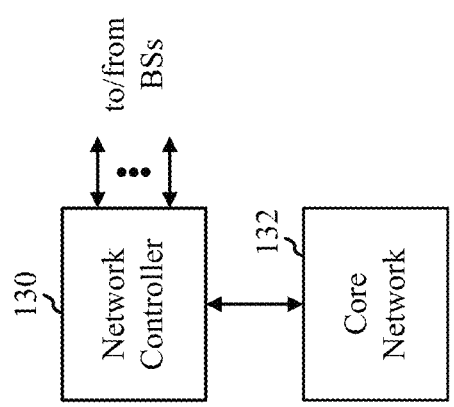

Aspects of the present disclosure provide apparatus, methods, processing systems, and computer readable mediums for signaling a user equipment (UE) to put a sidelink (SL) component carrier (CC) into dormancy, or take the SL CC out of dormancy, in either Mode 1 or Mode 2 sidelink communications.

In aspects of the present disclosure, such as in a Mode 1 communications system, a BS (e.g., a gNB) schedules SL transmissions made by UEs. The BS may send a DCI format 3_0 with a resource allocation to a UE for the UE to make/provide a SL transmission for another UE. In aspects of the present disclosure, a UE may transmit a SL transmission using carrier aggregation (CA) with multiple SL CCs. According to aspects of the present disclosure, not all SL CCs may need to be used at all times, and thus it may be advantageous to put some SL CCs into dormancy.

For example, a UE may receive DCI 3_0 in any Uu CC that is configured on that UE. Such configuration may result in high monitoring overhead (e.g., power consumption), especially when a UE uses CA with multiple SL CCs. Therefore, placing some SL CCs into dormancy allows a UE to stop monitoring for control channels in those CCs, thus saving power. Aspects of the present disclosure may enable a BS to instruct a first UE to place one or more SL CCs into a dormant state, allowing the first UE to save power. Aspects of the present disclosure may also enable a BS to inform other UEs that the first UE has placed the SL CC(s) into the dormant state, so that the other UEs do not attempt to transmit SL transmissions to the first UE via that SL CC(s).

In aspects of the present disclosure, such as in a Mode 2 communications system, a UE schedules SL transmissions that the UE makes to other UEs. The UE may send a sidelink control information (SCI) with information regarding resources to be used for transmitting an SL transmission (e.g., a physical sidelink shared channel (PSSCH)) to another UE, as well as other transmission parameters. In aspects of the present disclosure, a UE may transmit a SL transmission using CA with multiple SL CCs. According to aspects of the present disclosure, not all SL CCs need to be used at all times, and thus it may be advantageous to put some SL CCs into SL dormancy.

For example, a UE may receive SCI in any SL CC that is configured on that UE, which will result in high monitoring overhead (e.g., power consumption) if a UE uses CA with multiple SL CCs. In the example, placing some SL CCs into dormancy allows a UE to stop monitoring for control channels in those CCs, and the UE saves power. However, if a SL CC is in dormancy at a first UE, then other UEs should not transmit SCI to the first UE via that SL CC, and it is desirable for the other UEs to be notified that the first UE has placed the SL CC into dormancy. Thus, aspects of the present disclosure enable a first UE to notify other UEs that the first UE will place one or more SL CCs into a dormant state, allowing the first UE to save power. In some aspects of the present disclosure, the first UE directly notifies the other UEs that the first UE will place the one or more SL CCs into the dormant state and waits for acknowledgments (ACKs) of the notification from the other UEs. In some aspects of the present disclosure, the first UE notifies a BS to inform other UEs that the first UE has placed the SL CC(s) into the dormant state, and the BS does not send an ACK to the first UE until the BS receives ACKs from the other UEs.

The following description provides examples of signaling a user equipment (UE) to put a sidelink (SL) component carrier CC into dormancy or take the SL CC out of dormancy in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

According to certain aspects, the BSs 110 and UEs 120 may be configured for signaling a UE to put a sidelink (SL) component carrier (CC) into dormancy or take the SL CC out of dormancy. As shown in FIG. 1, the BS 110a includes a CC manager 112 that transmits an indication to a UE (e.g., UE 120a) to put a first CC into dormancy; and determines that the UE put a SL CC into a dormant state in response to the indication, in accordance with aspects of the present disclosure. The UE 120a includes a SL CC manager 122 that receiving an indication to put a first CC into dormancy; and puts a SL CC into a dormant state in response to the indication, in accordance with aspects of the present disclosure.

According to certain aspects, the SL information manager 112 receives an indication that a first user equipment (e.g., UE 120a) will put a SL CC into a dormant state; and transmits an acknowledgment (ACK) of the indication. The SL manager 122a transmits (e.g., to BS 110a and/or UE 120b) an indication that the UE will put a SL CC into a dormant state; and receives an ACK of the indication (e.g., from BS 110a and/or UE 120b). The SL manager 122a may also receive (e.g., from BS 110a and/or UE 120b) an indication that a second UE (e.g., UE 120b) will put a SL CC into a dormant state; and transmit an ACK of the indication (e.g., to BS 110a and/or UE 120b), in accordance with aspects of the present disclosure. The UE 120b includes a SL manager 122b that transmits (e.g., to BS 110a and/or UE 120a) an indication that the UE will put a SL CC into a dormant state; and receives an ACK of the indication (e.g., from BS 110a and/or UE 120a). The SL manager 122b may also receive (e.g., from BS 110a and/or UE 120a) an indication that a second UE (e.g., UE 120a) will put a SL CC into a dormant state; and transmit an ACK of the indication (e.g., to BS 110a and/or UE 120a), in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple cells.

The BSs 110 communicate with UEs 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile. Wireless communication network 100 may also include relay stations (e.g., relay station 110*r*), also referred to as relays or the like, that receive a transmission of data and/or other information from an upstream station (e.g., a BS 110*a* or a UE 120*r*) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
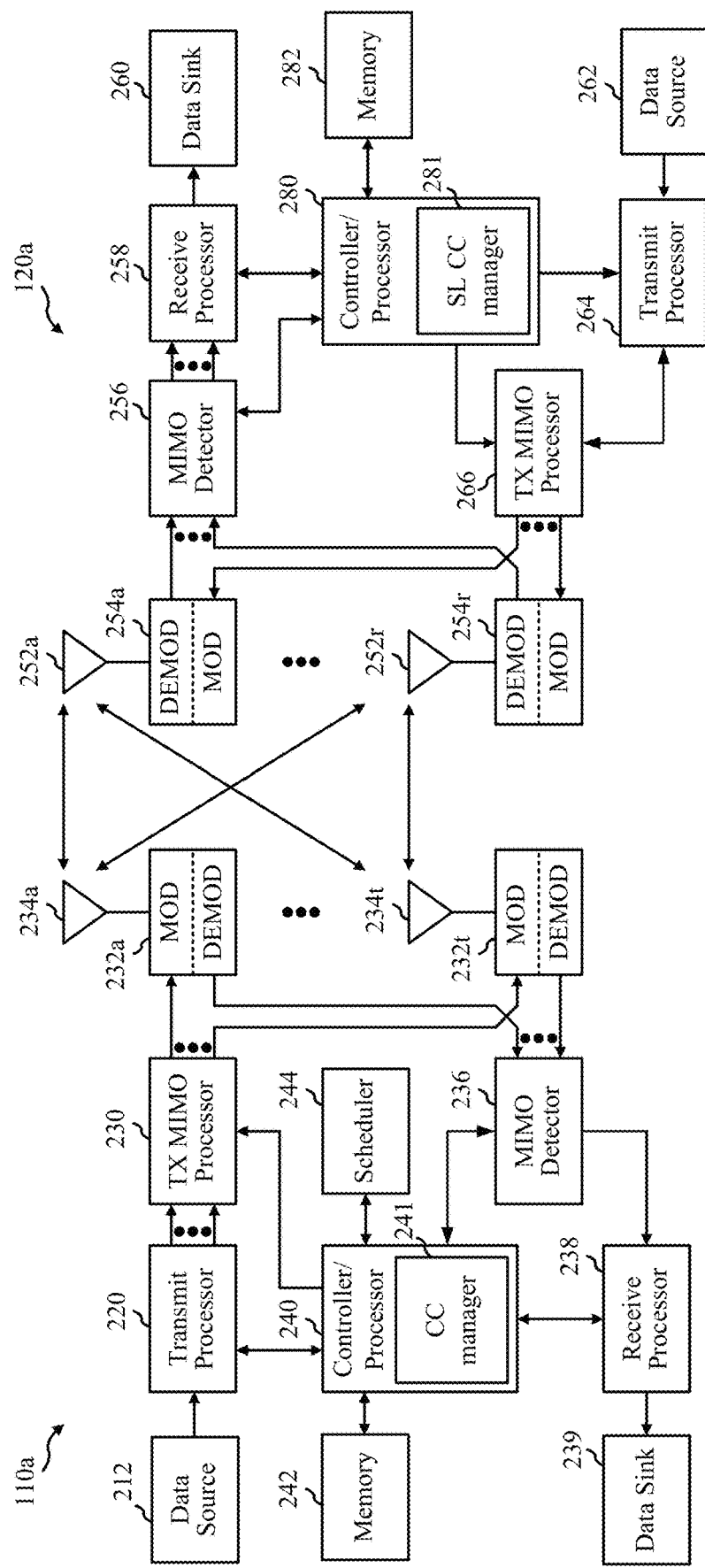
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 240 of the BS 110*a* has a CC manager 241 that transmitting an indication to a user equipment (UE) to put a first CC into dormancy; and determines that the UE put a SL CC into a dormant state in response to the indication, according to aspects described herein. As shown in FIG. 2, the controller/processor 280 of the UE 120*a* has an SL CC manager 281 that receives an indication to put a first CC into dormancy; and puts a SL CC into a dormant state in response to the indication, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
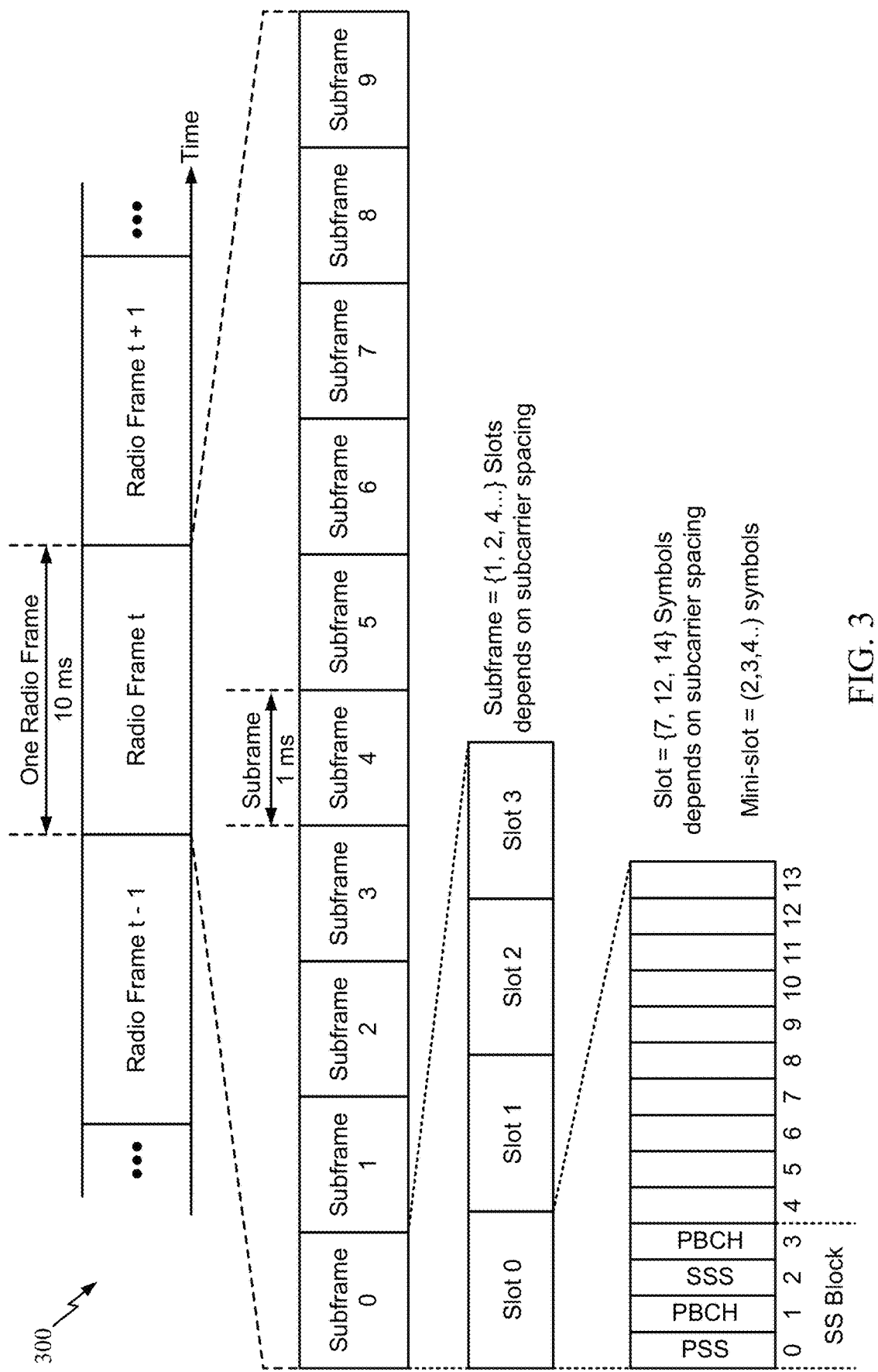
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, ... slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

According to aspects of the present disclosure, a UE may be directed to place a Uu-interface component carrier into dormancy (e.g., a dormant state). The UE may only be directed to place a component carrier used for a secondary cell (SCell), and may not place a component carrier used for a primary cell (PCell) into dormancy.

In aspects of the present disclosure, a UE directed to place a Uu-interface CC into dormancy may move a corresponding SCell to a state equivalent to a state of a dormant bandwidth part (BWP). In such a state, a UE skips (i.e., does not perform) all PDCCH monitoring for the dormant SCell (i.e., similar to the UE behavior for a dormant BWP). In such a state, the UE may only receive channel state information reference signals (CSI-RS) transmitted by the SCell and maintain an automatic gain control (AGC) process for the SCell.

According to aspects of the present disclosure, a UE directed to place a Uu-interface into dormancy may not monitor the PDCCH for the SCell, even for cross-carrier scheduling, when the scheduled SCell is in dormancy.

In aspects of the present disclosure, SCells may be moved in and out of dormancy in non-overlapping dormancy groups, with each group addressed by a bit (e.g., in a bitmap) in a downlink control information (DCI) directed to the UE.

According to aspects of the present disclosure, when a bit in a DCI indicates that a UE should take an SCell out of dormancy, then the UE configures that SCell as being in a default first non-dormant BWP.

In aspects of the present disclosure, when a UE is directed to place an SCell into dormancy, the UE stops any UL transmission in the SCell, suspends any configured uplink grant of Type 1 in the SCell, and clears any configured uplink grant of configured grant Type 2 in the SCell.

According to aspects of the present disclosure, when a UE is directed to place an SCell into dormancy, the UE may stop all sounding reference signal (SRS) transmissions (including aperiodic SRS, semi-periodic SRS and periodic SRS) in the SCell.

In aspects of the present disclosure, placing a Uu-interface CC into dormancy allows a UE to save power by eliminating PDCCH monitoring in the dormant CC.

According to aspects of the present disclosure, switching from dormant to non-dormant may be quicker than performing SCell activation on a UE.

In aspects of the present disclosure, in a Mode 1 communications system, a BS (e.g., a gNB) schedules sidelink (SL) transmissions that are made by UEs. The BS may send a DCI format 3_0 with a resource allocation to a UE for the UE to make a SL transmission.

According to aspects of the present disclosure, a UE transmitting a sidelink transmission may transmit (e.g. using transmission resources allocated to the UE by a BS) a sidelink control information (SCI) of format 1 (SCI1) and/or of format 2 (SCI2) via a physical sidelink control channel (PSCCH) and/or physical sidelink shared channel (PSSCH) to a UE intended to receive the SL transmission. The SCI1 or SCI2 may contain information about the SL transmission, including resource information and transmission parameters.

In aspects of the present disclosure, a UE may transmit a SL transmission using carrier aggregation (CA) with multiple SL component carriers.

According to aspects of the present disclosure, not all Uu CCs need to be used at all times, and thus it may be advantageous to put some Uu CCs into Uu dormancy. For example, it is possible for a UE to receive DCI in any Uu CC that is configured on that UE, which will result in high monitoring overhead (e.g., power consumption) if a UE uses CA with multiple Uu CCs. In the example, placing some Uu CCs into dormancy allows a UE to stop monitoring for control channels in those CCs, and the UE saves power.

In some cases, a UE (e.g., UE 120a, shown in FIGS. 1-2) may be put in a discontinuous reception (DRX) mode for power savings. As illustrated in the example timeline 400 in FIG. 4, in DRX mode, the UE goes to sleep to save power and wakes up periodically to monitor the physical downlink control channel (PDCCH) for potential scheduled downlink reception and/or uplink transmission for the UE. If DRX is not configured, then UE may always be ready to receive PDCCH.

Figure 4:
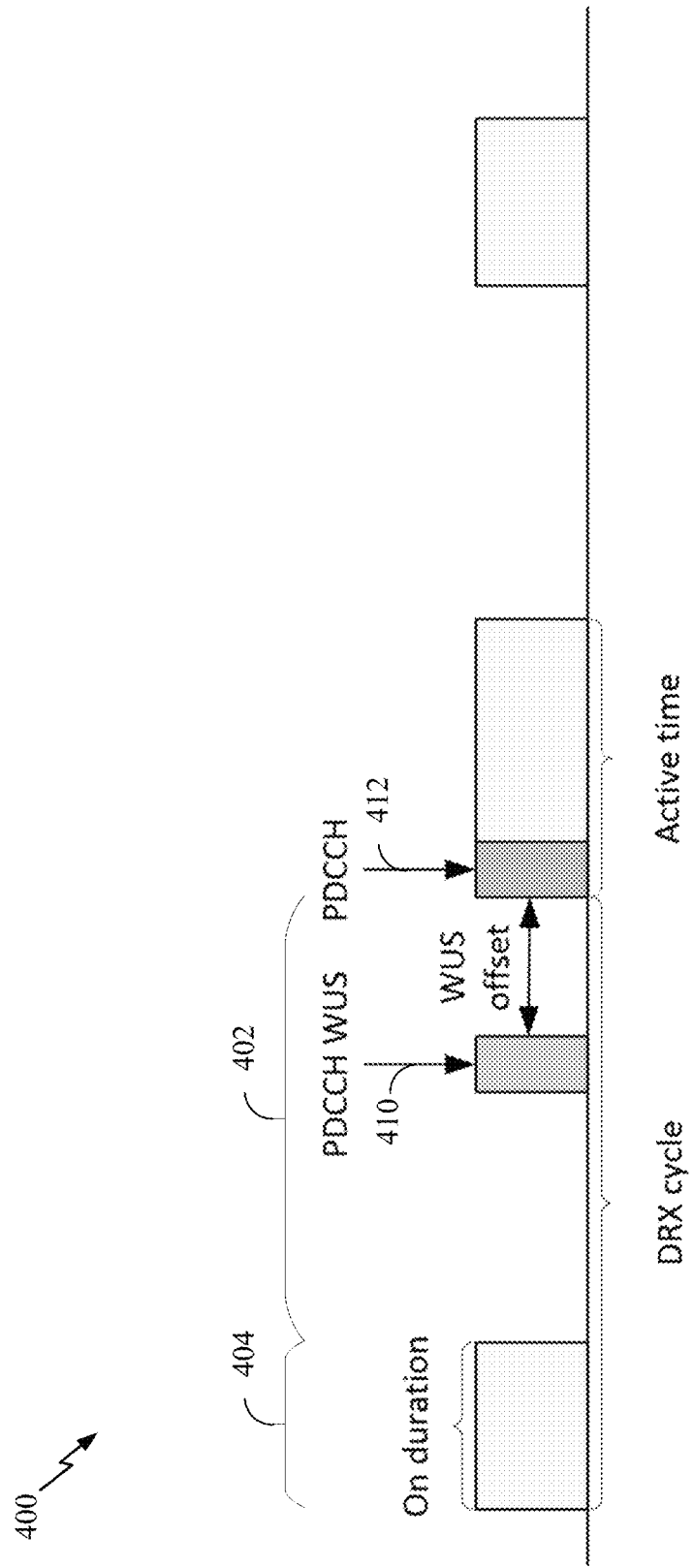
FIG. 4 illustrates an example discontinuous reception (DRX) scenario, in accordance with certain aspects of the present disclosure.

As illustrated in FIG. 4, DRX consists of a sleep portion 402 and a wakeup portion 404. The wakeup portion is called the "On Duration" where the UE monitors for a PDCCH transmission that schedules data. If PDCCH (carrying a DCI) is detected, the On Duration may be extended. The duration after the UE wakes up (including the On Duration and the extended portion) is called "Active Time". A wake up signal (WUS) 410 may be monitored by the UE outside the Active Time. The WUS may be detected with relatively simple receiver components, allowing the UE to stay in a reduced power state. The WUS indicates whether the UE should wake up (more fully) for PDCCH monitoring. In some cases, a PDCCH can contain an SCell dormancy indication field. If DRX is configured for a UE, there are various scenarios for sending such a PDCCH. According to a first scenario, outside the Active Time, the PDCCH may be sent as the PDCCH WUS. According to a second scenario, inside the Active Time, the PDCCH 412 may or may not additionally schedule data. If DRX is not configured, which could be considered a third scenario, the same mechanism for inside Active Time (i.e., a PDCCH that may or may not additionally schedule data) may be applied.

The SCell dormancy indication field in the PDCCH may indicate dormancy for each group of SCells individually (e.g., with the same behavior applied to each SCell in a group). In some cases, switching between dormancy-like behavior and non-dormancy-like behavior may be realized by bandwidth part (BWP) switching between a dormant BWP and a regular BWP that allows full utilization of the SCell. For example, SCells configured for a UE may be grouped into 2 groups. In the example, an SCell dormancy indication for the first group puts all SCells in the first group into dormancy.

According to aspects of the present disclosure, grouping of SCells may be different for dormancy indication in a WUS and dormancy indication in a PDCCH in active time.

Figure 5:
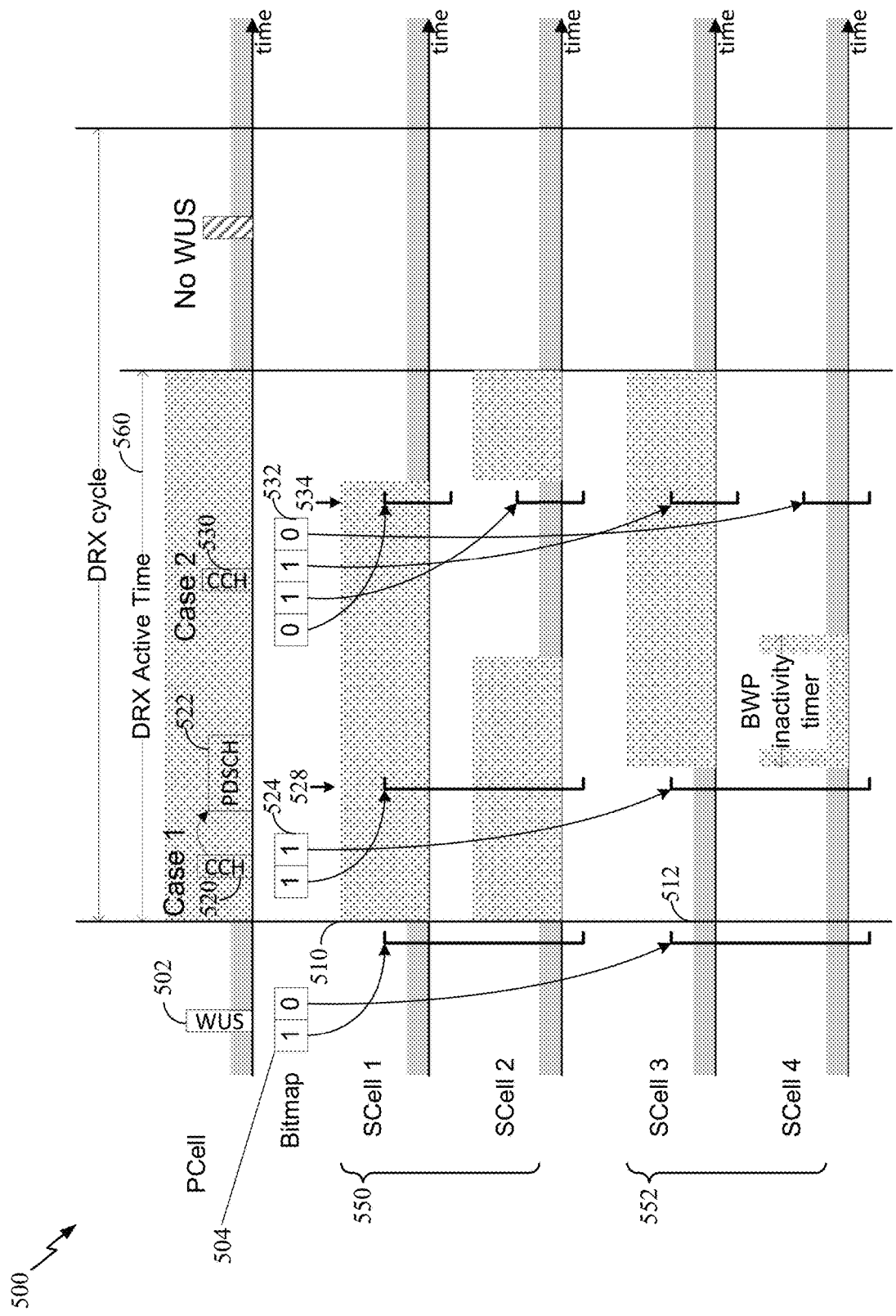
FIG. 5 is an exemplary timeline of SCell activation and deactivation, in accordance with aspects of the present disclosure.

FIG. 5 is an exemplary timeline 500 of SCell activation and deactivation operations by a UE and a BS (e.g., UE 120a and BS 110a shown in FIGS. 1-2), in accordance with aspects of the present disclosure. At 502, outside of the DRX active time 560, the BS transmits a WUS including a dormancy indication 504 for each of a first SCell group 550 and a second SCell group 552. The dormancy indication 504 indicates that the UE should make the first SCell group non-dormant and the second SCell group dormant. The UE makes the first SCell group non-dormant at 510 and makes the second SCell group dormant at 512. During the DRX active time, the BS transmits a control channel 520 that schedules a PDSCH 522 and includes a dormancy indication 524 for each of a first SCell group 550 and a second SCell group 552.

The first SCell group includes SCell 1 and SCell 2. The second SCell group includes SCell 3 and SCell 4. The dormancy indication 524 indicates that the UE should make the first SCell group non-dormant and the second SCell group non-dormant. At 526, the UE makes the first SCell group and the second SCell group non-dormant. Later, the BS transmits a control channel (CCH) 530 that does not schedule a PDSCH and includes a dormancy indication 532 for each of SCell 1, SCell 2, SCell 3, and SCell 4. The dormancy indication 532 indicates that the UE should make the SCell 1 dormant, SCell 2 non-dormant, SCell 3 non-dormant, and SCell 4 group dormant. At 534, the UE makes the SCell 1 dormant, SCell 2 non-dormant, SCell 3 non-dormant, and SCell 4 group dormant.

While FIG. 5 illustrates SCell operation in which the groups of SCells are the same for dormancy indication in WUS and for dormancy indication in PDCCHs that schedule PDSCHs, the present disclosure is not so limited. That is, a UE can use one grouping of SCells when responding to WUS dormancy indications, and the UE can use a different grouping of SCells when responding to dormancy indications in PDCCHs that are not in WUS.

According to aspects of the present disclosure, when a UE puts an SL CC into dormancy, then the UE does not monitor for SL SCI from other UEs in the dormant SL CC, and the UE saves power by not monitoring for SCI in the SL CC. In addition, the UE may (or may not) transmit SL CSI, SRS, and/or SSB RS to other UEs in the SL CC. In particular, the UE may (or may not) transmit beam-forming detection (BFD) reference signals in the dormant SL CC.

In aspects of the present disclosure, a UE may receive SL CSI, SRS, and/or SSB RS from other UEs in the dormant SL CC. In particular, the UE may continue receiving BFD RS from other UEs in the dormant SL CC.

According to aspects of the present disclosure, the UE may (or may not) receive a PSSCH and/or transmit a PSFCH in the dormant SL CC. The UE may be scheduled to receive the PSSCH via cross-carrier SL scheduling, wherein a control channel on another (non-dormant) CC schedules the PSSCH on the dormant SL CC. In such a case, the UE may still save power by not monitoring for SCI in the dormant SL CC.

In aspects of the present disclosure, the UE may (or may not) transmit SCI and/or PSSCH and receive PSFCH in the dormant SL CC.

Currently known techniques do not define signaling for a communications system to instruct a UE to put a SL CC into dormancy or take the SL CC out of dormancy.

Accordingly, it is desirable to develop techniques and apparatus for signaling a UE to put a SL CC into dormancy or take the SL CC out of dormancy.

Example Sidelink Dormancy Indication in Mode 1 Communications Systems

Aspects of the present disclosure provide techniques and apparatus for signaling a UE to put a SL CC into dormancy or take the SL CC out of dormancy.

As previously described, a BS (e.g., a gNB) may transmit a dormancy indication to a UE to cause the UE to place a Uu-interface CC into a dormant state. In aspects of the present disclosure, a BS and a UE may each treat a SL CC as another Uu-interface CC for the purpose of dormancy. That is, a BS may transmit a dormancy indication in a WUS or a control channel (see, e.g., FIG. 5) that applies to a SL CC, and a UE receiving that dormancy indication may place the indicated SL CC into a dormant state.

In aspects of the present disclosure, groupings used for WUS-based or PDCCH-based dormancy indication may include SL CCs. For example, a UE may be configured with 2 Uu-interface SCells and 2 SL CCs. In the example, Group 1 may include the first Uu-interface SCell and SL CC1. Still in the example, Group 2 may include the second Uu-interface SCell and SL CC2. In the example, a dormancy indication for group 1 would cause the UE to put the first Uu-interface SCell and SL CC1 into dormancy. Likewise, a dormancy indication for group 2 would cause the UE to put the second Uu-interface SCell and SL CC2 into dormancy. For a dormancy indication in a PDCCH that does not schedule a PDSCH (see, e.g., CCH 530 in FIG. 5), the dormancy indication may use 4 bits, with each bit indicating dormancy or non-dormancy for one of the Uu-interface SCells or one of the SL CCs. Thus, a dormancy indication of 1010 could mean put second Uu SCell and SL CC2 into dormancy.

In another example, instead of the grouping described above, a UE may be configured with 4 groups. In this example, Group 1 may include the first Uu-interface SCell only; Group 2 may include the second Uu SCell only, Group 3 may include SL CC1 only; and Group 4 may include SL CC2 only. That is, groupings may or may not mix Uu-interface SCells and SL CCs.

According to aspects of the present disclosure, a UE may derive an SL CC dormancy indication from a Uu-interface SCell dormancy indication based on a rule. For example, a UE may be configured with 4 Uu-interface SCells and 4 SL CCs. In this example, Group 1 includes the first and second Uu-interface SCells, and group 2 includes the third and fourth Uu-interface SCells. In the example, if the UE receives a dormancy indication for group 1, then the UE puts the first and second Uu-interface SCells into dormancy and puts the first and second SL CCs into SL dormancy, based on a rule configured by a BS (e.g., a gNB) or based on a network communication standard, e.g., the dormancy state of the i-th SL CC is to be the same as the dormancy state of the i-th Uu-interface SCell.

In aspects of the present disclosure, a UE may receive a configuration from a BS indicating a correspondence between one or more Uu-interface SCells and one or more SL CCs, such that a dormancy indication for a Uu-interface SCell also indicates that the UE should put the corresponding SL CC into dormancy.

According to aspects of the present disclosure, a UE or BS may determine that a UE should put an SL CC into dormancy based on a dormancy indication to put a Uu-interface SCell into dormancy, when the SL CC and the Uu-interface SCell operate on a same set of frequency resources (e.g., a frequency band, a channel, or a sub-channel).

In aspects of the present disclosure, SL CC dormancy may be indicated in a separate control message from a BS (e.g., a gNB). That is, a BS may send a message to a UE indicating the UE to put a SL CC into a dormant state without affecting Uu-interface SCells configured on the UE, if any.

According to aspects of the present disclosure, SL CCs can be grouped, and an indication of dormancy for a group applies to all the SL CCs within that group.

In aspects of the present disclosure, a dormancy indication can specify individual SL CCs to be put into dormancy instead of specifying groups as previously described, similar to the indication of Uu-interface SCells with a PDCCH that does not schedule a PDSCH (e.g., CCH 530, shown in FIG. 5).

According to aspects of the present disclosure, a control message to indicate dormancy for individual SL CCs or SL CC groups can be DCI format 3_0 or a medium access control (MAC)-control element (MAC-CE).

Figure 6:
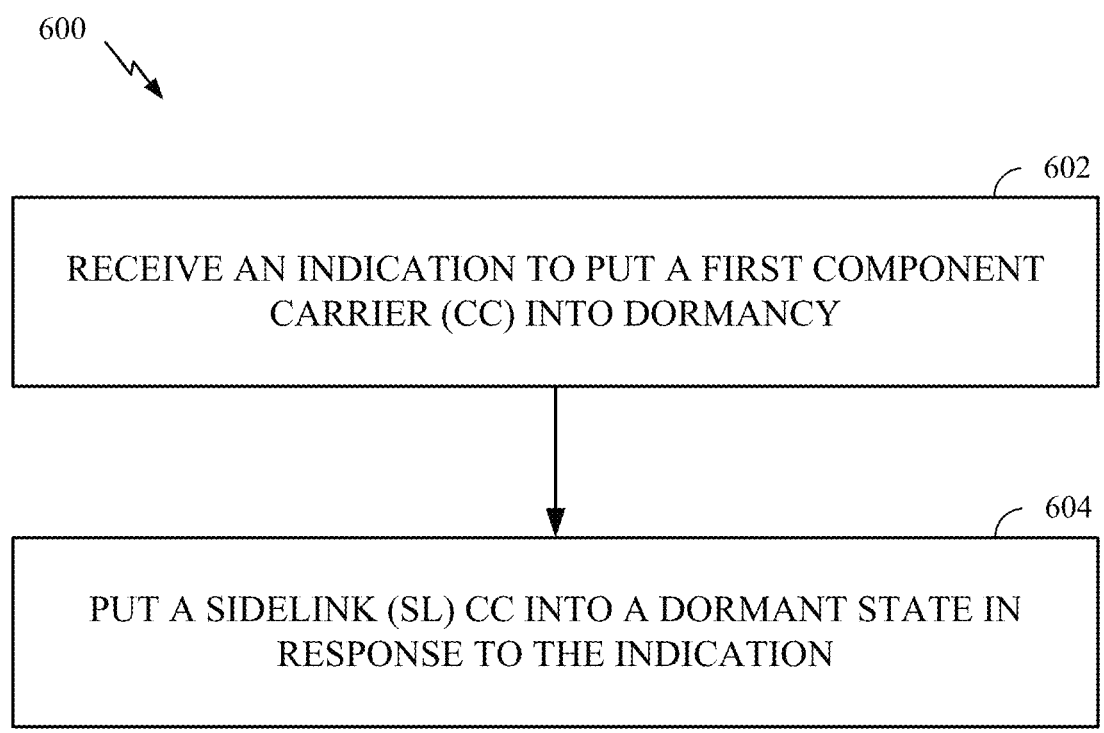
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., the UE 120*a* in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 602, by receiving an indication to put a first CC into dormancy. At 604, operations 600 may continue by putting a SL CC into a dormant state in response to the indication with respect to the first CC. For example, the indication of the first CC dormancy may be an indication for a Uu CC dormancy. The UE may treat the SL CC as another Uu CC for dormancy indication purposes and apply the indication of the first CC to the SL CC. As aforementioned, in some cases, groupings used for WUS based or PDCCH based dormancy indication may include CL CCs. In another option, the UE may derive SL CC dormancy indication from the first CC dormancy indication (e.g., Uu dormancy indication) base on one or more rules. In a previous example, the UE may include four Uu SCells and four SL CCs. Group 1 includes the first and second Uu-interface SCells, and group 2 includes the third and fourth Uu-interface SCells. When the UE receives a dormancy indication for group 1, then the UE puts the first and second Uu-interface SCells into dormancy and puts the first and second SL CCs into SL dormancy, based on a rule configured by a BS (e.g., a gNB) or based on a network communication standard.

Figure 7:
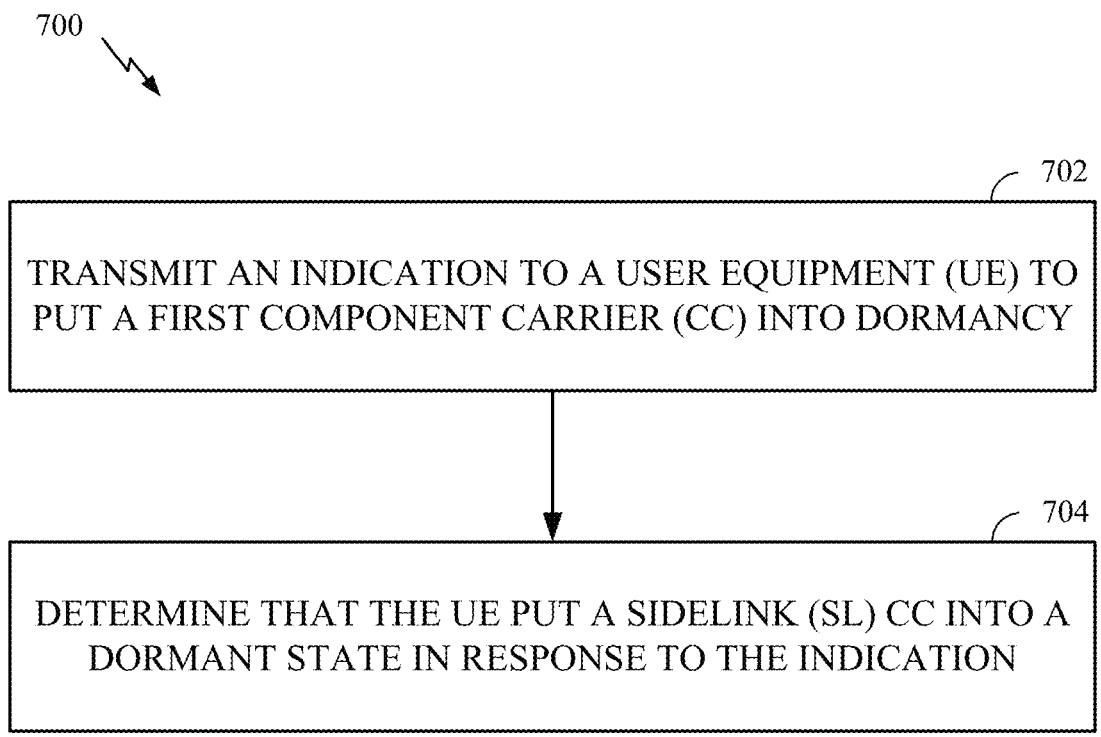
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by a BS (e.g., the BS 110*a* in the wireless communication network 100). The operations 700 may be complimentary to the operations 600 performed by the UE. The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 may begin, at 702, by transmitting an indication to a UE to put a first CC into dormancy. At 704, operations 700 may continue by determining that the UE put a SL CC into a dormant state in response to the indication. Examples of operations 700 may be complimentary to the examples discussed for operations 600 and various aspects previously presented.

Figure 8:
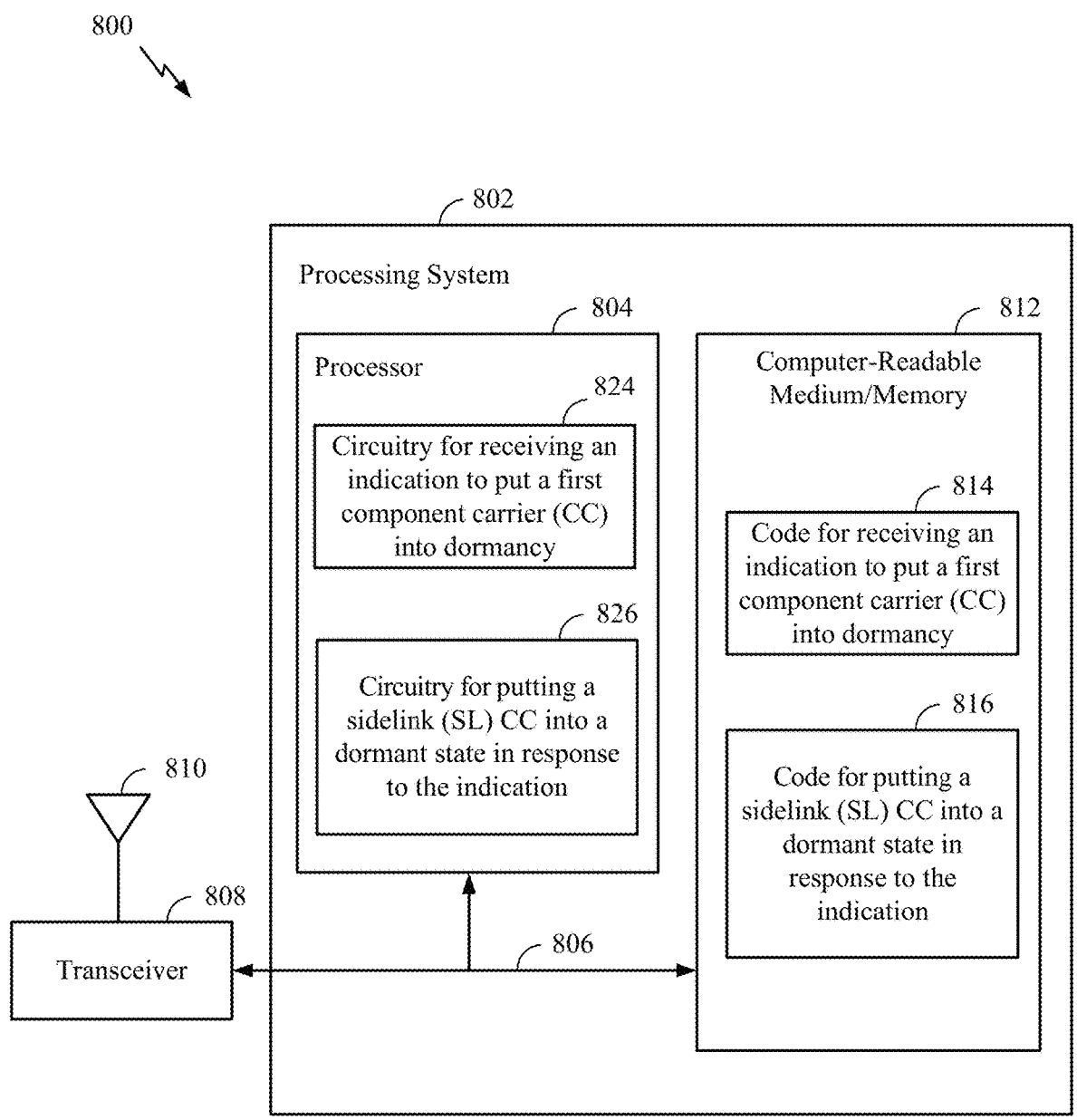
FIG. 8 illustrates a communications device that may include various components configured to perform the operations of FIG. 6, in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for signaling a UE to put a SL component carrier CC into dormancy or take the SL CC out of dormancy. In certain aspects, computer-readable medium/memory 812 stores code 814 for receiving an indication to put a first CC into dormancy; and code 816 for putting a SL CC into a dormant state in response to the indication. In certain aspects, the processor 804 has circuitry configured to implement the code stored in the computer-readable medium/memory 812. The processor 804 includes circuitry 824 for receiving an indication to put a first CC into dormancy; and circuitry 826 for putting a SL CC into a dormant state in response to the indication.

Figure 9:
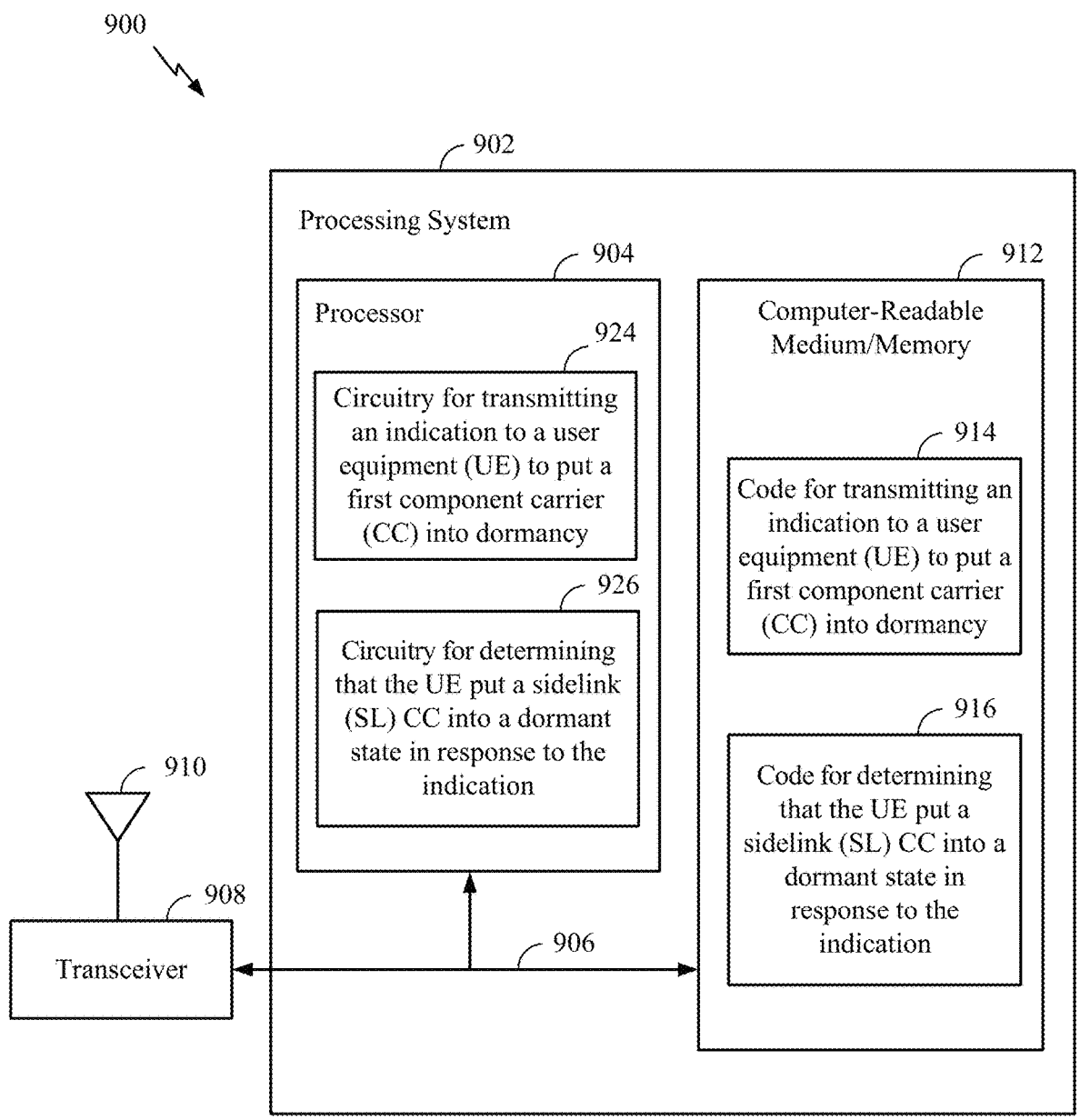
FIG. 9 illustrates a communications device that may include various components configured to perform the operations of FIG. 7, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for signaling a UE to put a SL component carrier CC into dormancy or take the SL CC out of dormancy. In certain aspects, computer-readable medium/memory 912 stores code 914 for transmitting an indication to a UE to put a first CC into dormancy; and code 916 for determining that the UE put a SL CC into a dormant state in response to the indication. In certain aspects, the processor 904 has circuitry configured to implement the code stored in the computer-readable medium/memory 912. The processor 904 includes circuitry 924 for transmitting an indication to a UE to put a first CC into dormancy; and circuitry 926 for determining that the UE put a SL CC into a dormant state in response to the indication.

Example Sidelink Dormancy Indication in Mode 2 Communications Systems

Aspects of the present disclosure provide apparatus, methods, processing systems, and computer readable mediums for signaling that a user equipment (UE) will put a sidelink (SL) component carrier CC into dormancy and await an acknowledgment (ACK) before putting the SL CC into dormancy.

Figure 10:
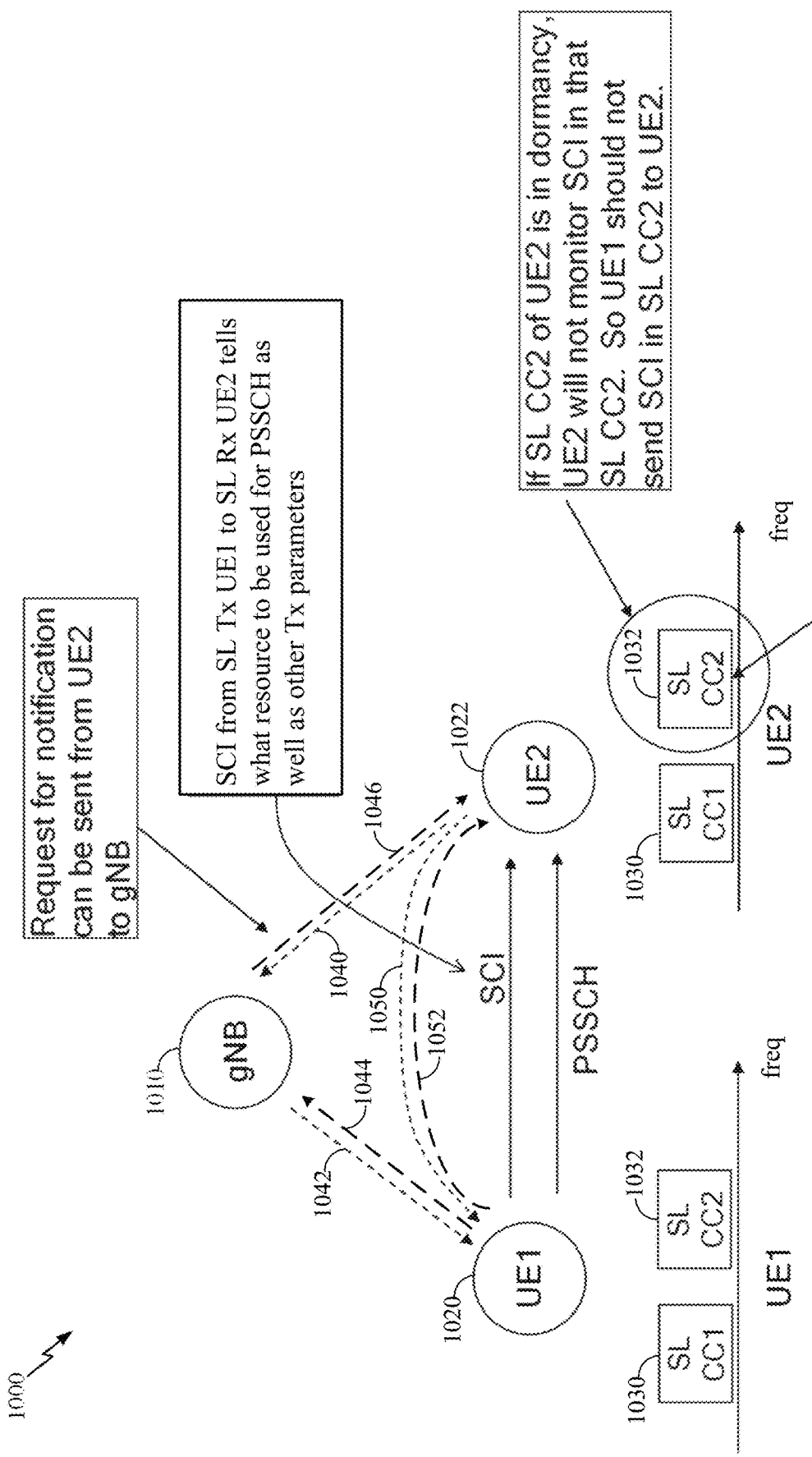
FIG. 10 is a schematic diagram of a communications system, in accordance with aspects of the present disclosure.

FIG. 10 is a schematic diagram of a communications system 1000, in accordance with aspects of the present disclosure. The communications system includes a gNB 1010 (which may be an example of BS 110*a*, shown in FIGS. 1-2) and UEs 1020 and 1022 (which may be examples of UEs 120*a* and 120*b*, shown in FIG. 1). In the communications system, each of the UEs is configured with two SL CCs 1030 and 1032. The SL CC 1032 has been made dormant by the UE 1022. According to aspects of the present disclosure, it is desirable that the UE 1020 not send any SL communications, such as SCI or PSSCH, via the SL CC 1032, because the UE 1022 has made SL CC 1032 dormant.

According to aspects of the present disclosure, a BS (e.g., gNB 1010 shown in FIG. 10) may indicate dormancy of a SL CC of a UE to other UEs. In these aspects, when a SL CC of a UE is put into dormancy, the UE notifies a BS (e.g., a gNB), and that BS notifies other UEs. Also in these aspects, when a SL CC of a UE is brought out of dormancy, the BS also notifies other UEs. In such aspects, which UEs are notified depends on the connectivity of the UE with the dormant SL CC. In such aspects, the BS may only notify UEs that are connected (e.g., via a sidelink) to the UE with the dormant SL CC. In such aspects, the BS may send an ACK to the UE with the dormant SL CC to let the UE know that other UEs have been notified. In some such aspects, only after receiving the ACK does the UE put the SL CC into dormancy.

Returning to FIG. 10, in aspects of the present disclosure, when the UE 1022 determines to put SL CC 1032 into dormancy, the UE 1022 sends a notification 1040 to the gNB 1010. The gNB sends another notification 1042 to the UE 1020. The UE 1020 sends an acknowledgment 1044 of the notification 1042 to the gNB. The gNB then sends an acknowledgment 1046 of the notification 1040 to the UE 1022. After receiving the acknowledgment 1046, the UE 1022 puts the SL CC 1032 into dormancy.

In aspects of the present disclosure, a first UE may directly notify other UEs that the first UE will put a SL CC into dormancy. In such aspects, the notification can be sent via one or more of a SCI, a SCI2, a PSSCH, or a physical sidelink feedback channel (PSFCH). In some aspects of the present disclosure, for each UE, there may be a 'primary SL CC' (e.g., similar to a Uu-interface primary cell (PCell)) that the UE never puts into dormancy. In some aspects of the present disclosure, a dormancy notification for other SL CCs (i.e., SL CCs that are not a primary SL CC) may be sent and/or received via a primary SL CC. In aspects of the present disclosure, a dormancy notification from a first UE to another UE must be followed by an ACK from the other UE before the first UE can put the SL CC into dormancy.

FIG. 10 shows an example of a first UE directly notifying another UE that the first UE will put a SL CC into dormancy. In this example, the UE 1022 determines to put SL CC 1032 into dormancy and sends a dormancy notification 1050 for SL CC 1032 to UE 1020. UE 1020 sends an ACK 1052 for the dormancy notification, so that the UE 1022 knows that UE 1020 will not send SCI in SL CC2. Otherwise, if dormancy notification was not received by UE 1020 due to some error and UE 1022 thinks UE 1020 received the notice, then UE 1020 may send a SCI in SL 1032 that UE 1022 will not receive because UE 1022 has stopped monitoring SL CC 1032.

Figure 11:
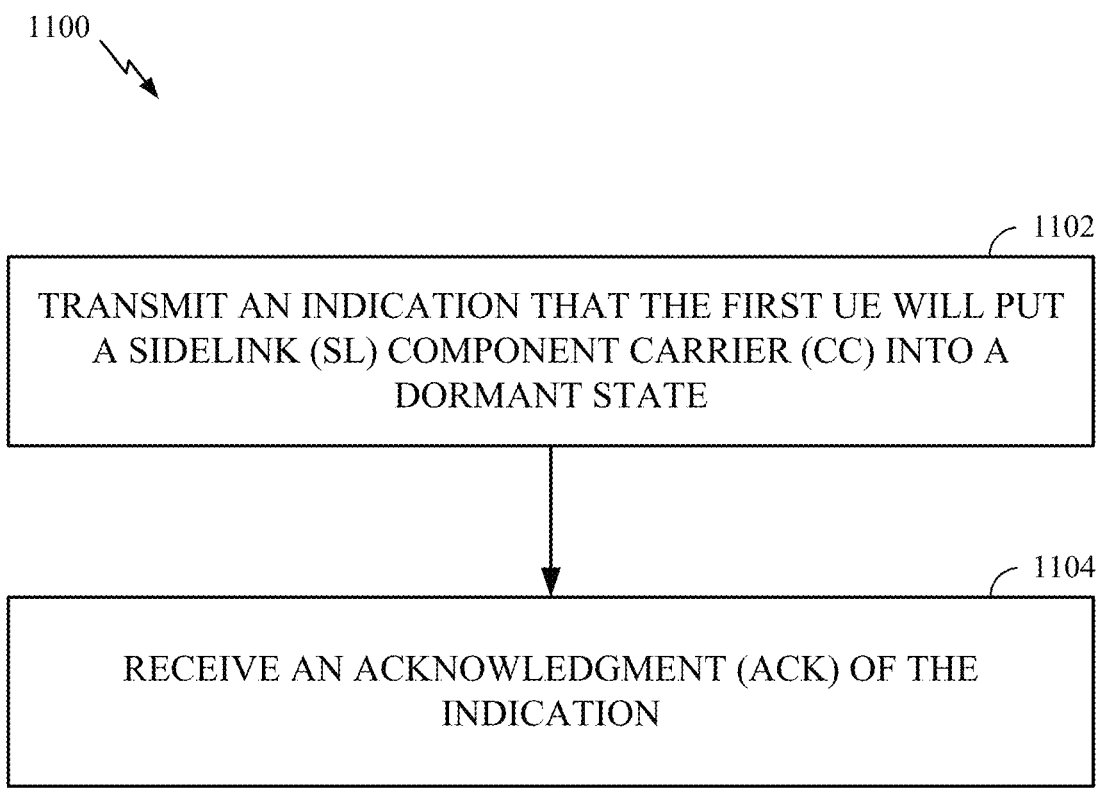
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by a UE (e.g., the UE 120*a* or UE 120*b* in the wireless communication network 100).

The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1102, by transmitting an indication that the first UE will put a SL CC into a dormant state. At 1104, operations 1100 may continue by receiving an ACK of the indication.

Figure 12:
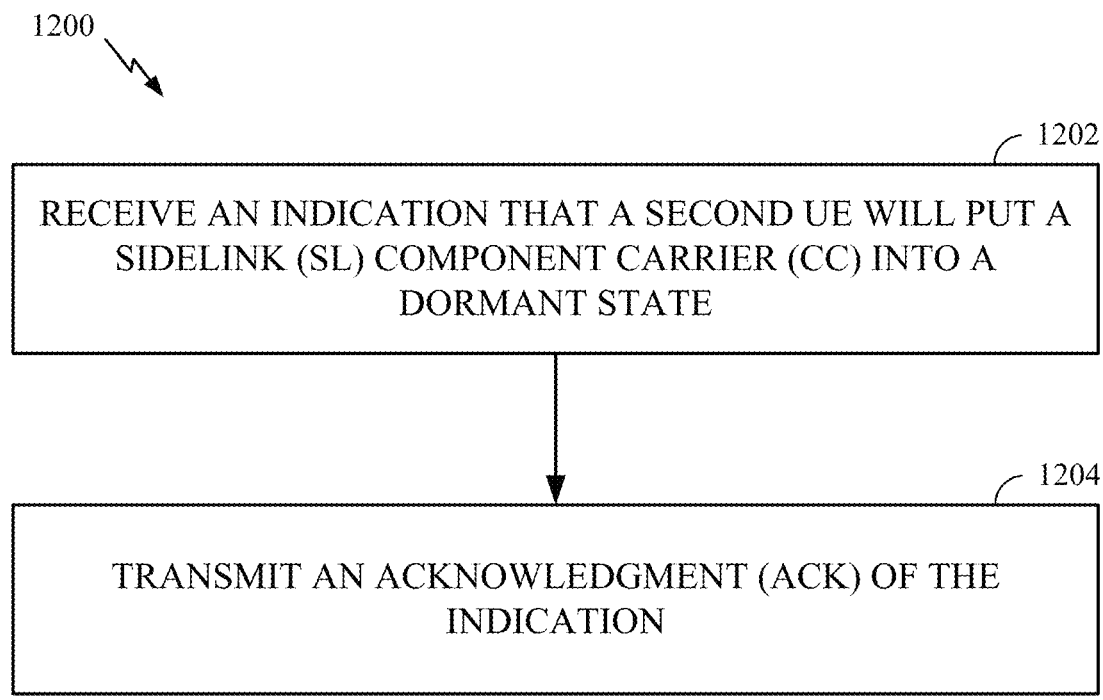
FIG. 12 is a flow diagram illustrating example operations for wireless communication by a UE, in accordance with certain aspects of the present disclosure.

FIG. 12 is a flow diagram illustrating example operations 1200 for wireless communication, in accordance with certain aspects of the present disclosure. The operations 1200 may be performed, for example, by a UE (e.g., the UE 120a or UE 120b in the wireless communication network 100). The operations 1200 may be complimentary to the operations 1100 performed by another UE. The operations 1200 may be implemented as software components that are executed and run on one or more processors (e.g., controller/processor 280 of FIG. 2). Further, the transmission and reception of signals by the UE in operations 1200 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1200 may begin, at 1202, by receiving an indication that a second UE will put a SL CC into a dormant state. At 1204, operations 1200 may continue by transmitting an ACK of the indication.

Figure 13:
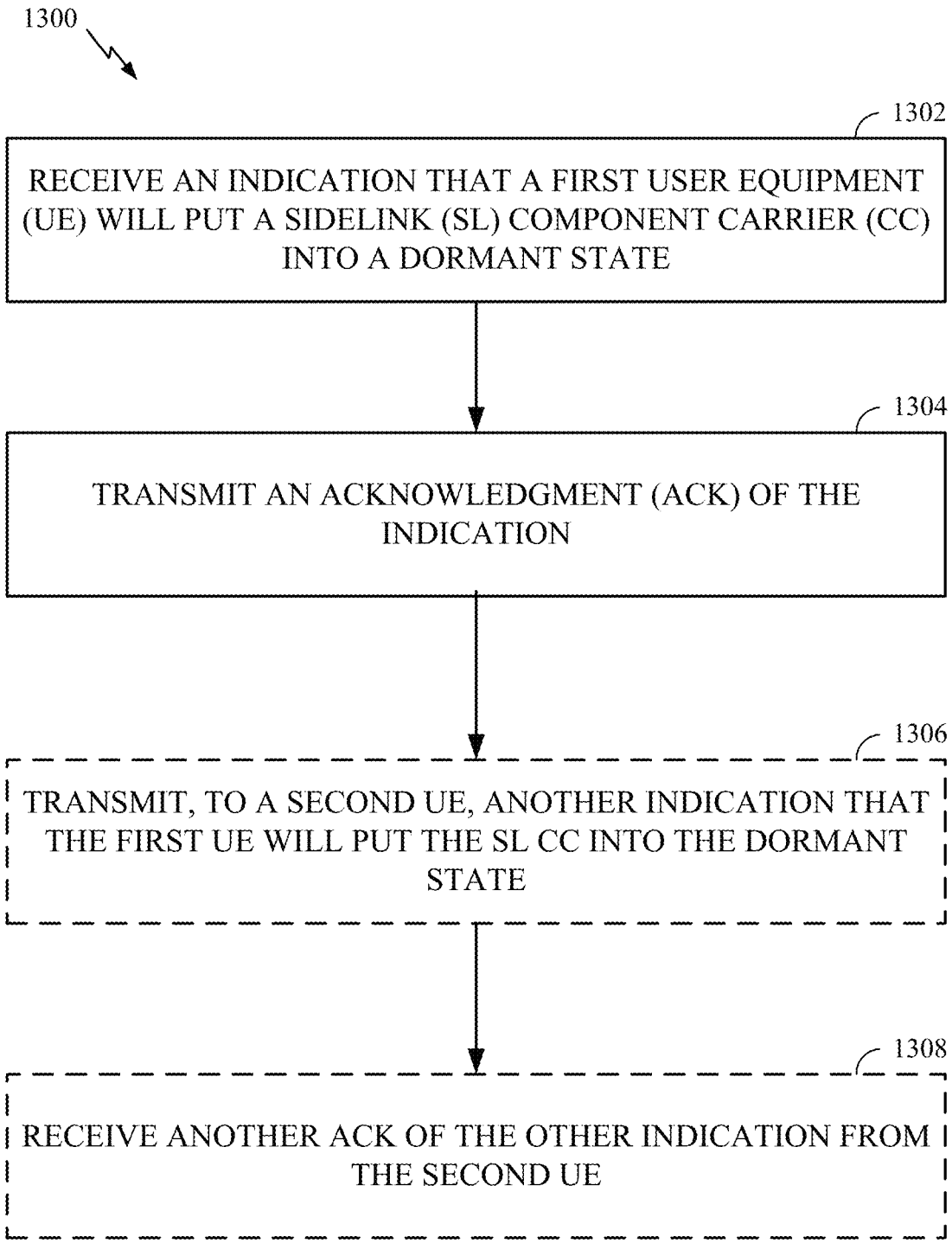
FIG. 13 is a flow diagram illustrating example operations for wireless communication by a BS, in accordance with certain aspects of the present disclosure.

FIG. 13 is a flow diagram illustrating example operations 1300 for wireless communication, in accordance with certain aspects of the present disclosure. The operations 1300 may be performed, for example, by a BS (e.g., the BS 110a in the wireless communication network 100). The operations 1300 may be complimentary to the operations 1200 performed by the UE. The operations 1300 may be implemented as software components that are executed and run on one or more processors (e.g., controller/processor 240 of FIG. 2). Further, the transmission and reception of signals by the BS in operations 1300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1300 may begin, at 1302, by receiving an indication that a first UE will put a SL CC into a dormant state. At 1304, operations 1300 may continue by transmitting an ACK of the indication. Operations 1300 may optionally continue at 1306 by transmitting, to a second UE, another indication that the first UE will put the SL CC into the dormant state. At 1308, operations 1300 may optionally continue by receiving another ACK of the other indication from the second UE.

Figure 14:
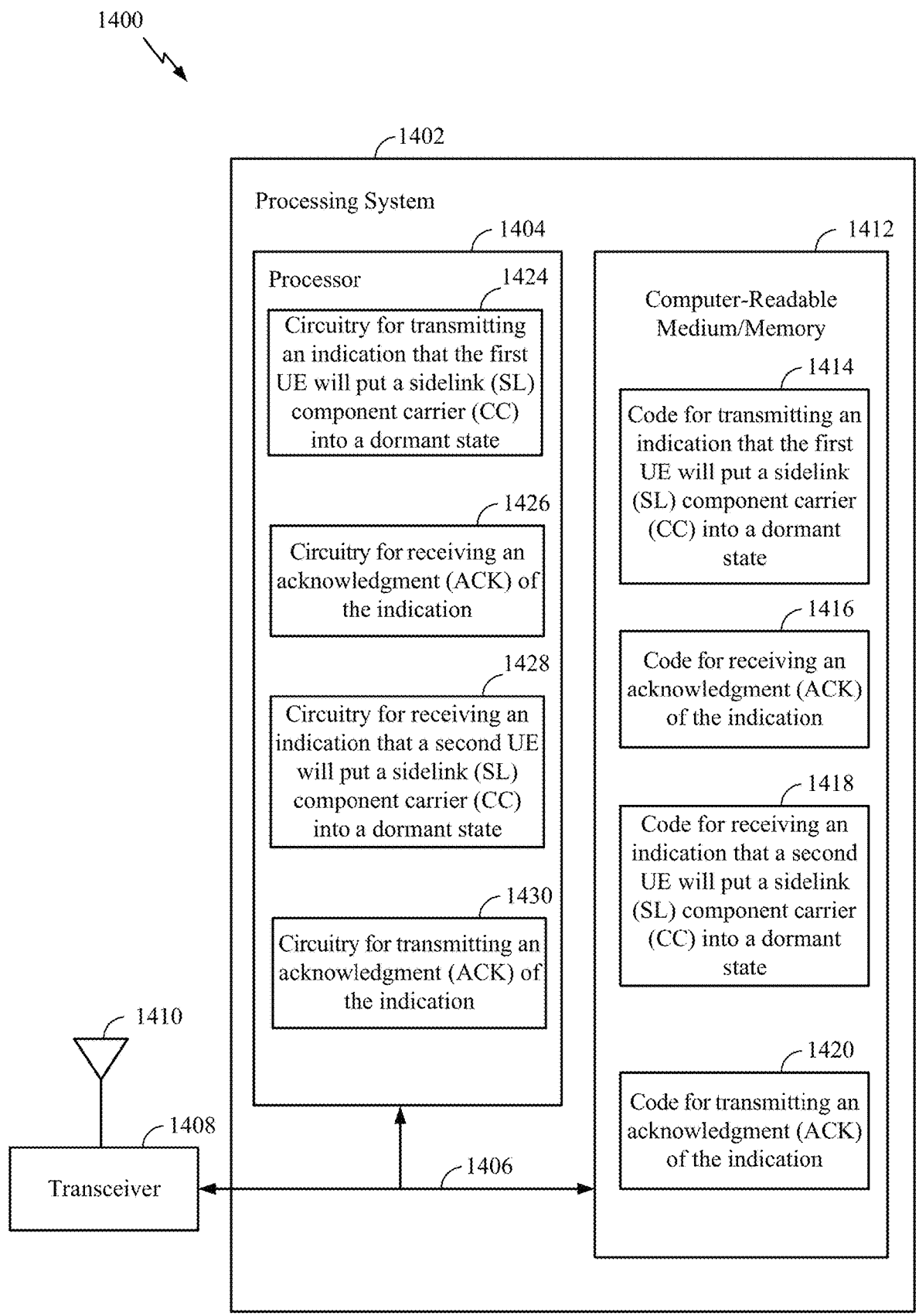
FIG. 14 illustrates a communications device that may include various components configured to perform the operations shown in FIG. 11 and/or FIG. 12, in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIGS. 5-6. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIGS. 11-12, or other operations for performing the various techniques discussed herein for signaling that a UE will put a SL component carrier CC into dormancy. In certain aspects, computer-readable medium/memory 1412 stores code 1414 for transmitting an indication that the first UE will put a SL CC into a dormant state; code 1416 for receiving an ACK of the indication; code 1418 for receiving an indication that a second UE will put a SL CC into a dormant state; and code 1420 for transmitting an ACK of the indication. In certain aspects, the processor 1404 has circuitry configured to implement the code stored in the computer-readable medium/memory 1412. The processor 1404 includes circuitry 1424 for transmitting an indication that the first UE will put a SL CC into a dormant state; circuitry 1426 for receiving an ACK of the indication; circuitry 1428 for receiving an indication that a second UE will put a SL CC into a dormant state; and circuitry 1430 for transmitting an ACK of the indication.

Figure 15:
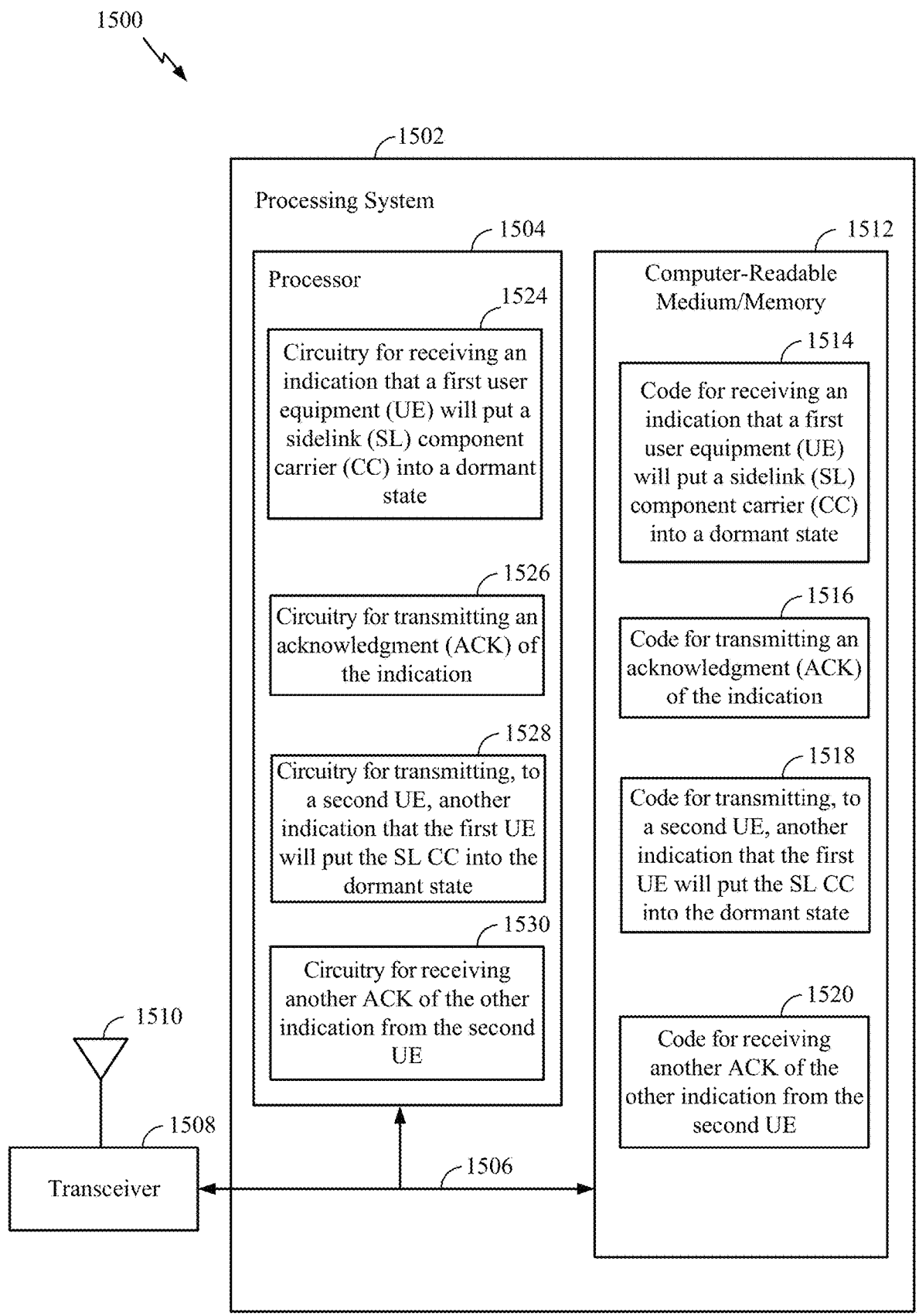
FIG. 15 illustrates a communications device that may include various components configured to perform the operations shown in FIG. 13, in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 7. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 13, or other operations for performing the various techniques discussed herein for signaling that a UE will put a SL component carrier CC into dormancy. In certain aspects, computer-readable medium/memory 1512 stores code 1514 for receiving an indication that a first UE will put a SL CC into a dormant state; code 1516 for transmitting an ACK of the indication; code 1518 for transmitting, to a second UE, another indication that the first UE will put the SL CC into the dormant state; and code 1520 for receiving another ACK of the other indication from the second UE. In certain aspects, the processor 1504 has circuitry configured to implement the code stored in the computer-readable medium/memory 1512. The processor 1504 includes circuitry 1524 for receiving an indication that a first UE will put a SL CC into a dormant state; circuitry 1526 for transmitting an ACK of the indication; circuitry 1528 for transmitting, to a second UE, another indication that the first UE will put the SL CC into the dormant state; and circuitry 1530 for receiving another ACK of the other indication from the second UE.

Example Aspects

Aspect 1: A method of wireless communication by a user equipment (UE), comprising: receiving an indication to put a first component carrier (CC) into dormancy; and putting a sidelink (SL) CC into a dormant state in response to the indication with respect to the first CC.

Aspect 2: The method of Aspect 1, further comprising refraining from decoding a control channel transmitted via the SL CC, when the SL CC is in the dormant state.

Aspect 3: The method of one of Aspects 1-2, wherein the first CC comprises a CC for a secondary cell (SCell).

Aspect 4: The method of one Aspects 1-3, wherein receiving the indication comprises receiving a physical downlink control channel (PDCCH) via a primary CC.

Aspect 5: The method of one of Aspects 1-4, wherein the indication further indicates to put a first group of secondary CCs including the first CC into dormancy.

Aspect 6: The method of Aspect 5, wherein the indication comprises a bit in a bitmap, wherein each entry in the bitmap corresponds to a different group of CCs.

Aspect 7: The method of one of Aspects 1-6, wherein the first CC comprises a CC for a secondary cell (SCell), and the method further comprises: determining the SL CC that corresponds to the CC for the SCell.

Aspect 8: The method of Aspect 7, further comprising: receiving a signal indicating a correspondence between the SL CC and the CC for the SCell.

Aspect 9: The method of one of Aspects 1-8, wherein the indication is received in a control message from a base station (BS), wherein the control message does not affect a configuration of a secondary cell (SCell) for the UE.

Aspect 10: The method of one of Aspect 9, wherein the indication further indicates to put a first group of CCs, including the SL CC, into dormancy.

Aspect 11: The method of Aspect 9, wherein the control message comprises a type 3_0 downlink control information (DCI).

Aspect 12: The method of Aspect 9, wherein the control message comprises a medium access control control element (MAC-CE).

Aspect 13: The method of one of Aspects 1-12, wherein receiving the indication further comprises receiving another indication to put the SL CC into the dormant state.

Aspect 14: A method for wireless communication by a base station (BS), comprising: transmitting an indication to a user equipment (UE) to put a first component carrier (CC) into dormancy; and determining that the UE put a sidelink (SL) CC into a dormant state in response to the indication with respect to the first CC.

Aspect 15: The method of Aspect 14, wherein the indication further indicates to put a CC for a secondary cell (SCell) into the dormant state.

Aspect 16: The method of one of Aspects 14-15, wherein transmitting the indication comprises transmitting a physical downlink control channel (PDCCH) via a primary CC.

Aspect 17: The method of one of Aspects 14-16, wherein the indication further indicates to put a first group of CCs including the first CC into dormancy.

Aspect 18: The method of Aspect 17, wherein the indication comprises a bit in a bitmap, wherein each entry in the bitmap corresponds to a different group of CCs.

Aspect 19: The method of one of Aspects 14-18, wherein the first CC comprises a CC for a secondary cell (SCell), and the method further comprises: determining the SL CC that corresponds to the CC for the SCell.

Aspect 20: The method of Aspect 19, further comprising: transmitting a signal indicating a correspondence between the SL CC and the CC for the SCell.

Aspect 21: The method of one of Aspects 14-20, wherein the indication is transmitted in a control message to the UE, wherein the control message does not affect a configuration of a secondary cell (SCell) for the UE.

Aspect 22: The method of Aspect 21, wherein the indication further indicates to put a first group of CCs, including the SL CC, into dormancy.

Aspect 23: The method of Aspect 21, wherein the control message comprises a type 3_0 downlink control information (DCI).

Aspect 24: The method of Aspect 21, wherein the control message comprises a medium access control control element (MAC-CE).

Aspect 25: The method of one of Aspects 14-24, further comprising: notifying at least one other UE that the UE put the SL CC into the dormant state.

Aspect 26: The method of one of Aspects 14-25, wherein transmitting the indication further comprises transmitting another indication to put the SL CC into the dormant state.

Aspect 27: The method of one of Aspects 14-26, wherein the determination is based on receiving an acknowledgment (ACK) from the UE.

Aspect 28: An apparatus for wireless communications, comprising means for performing one or more of the methods of Aspects 1-27.

Aspect 29: An apparatus for wireless communications, comprising: a memory; and a processor coupled to the memory, the memory and the processor configured to perform the method of one or more of Aspects 1-27.

Aspect 30: A computer-readable medium, the medium including instructions that, when executed by a processing system, cause the processing system to perform the method of one or more of Aspects 1-27.

Aspect 31: A method for wireless communication by a first user equipment (UE), comprising: transmitting an indication that the first UE will put a sidelink (SL) component carrier (CC) into a dormant state; and receiving an acknowledgment (ACK) of the indication.

Aspect 32: The method of Aspect 31, further comprising: putting the SL CC into the dormant state in response to the ACK.

Aspect 33: The method of one of Aspects 31-32, further comprising: refraining from decoding a control channel transmitted via the SL CC, when the SL CC is in the dormant state.

Aspect 34: The method of one of Aspects 31-33, wherein: transmitting the indication comprises transmitting the indication to a base station (BS); and the ACK is received from the BS.

Aspect 35: The method of one of Aspects 31-34, wherein: transmitting the indication comprises transmitting the indication to a second UE; and the ACK is received from the second UE.

Aspect 36: The method of Aspect 35, wherein transmitting the indication comprises transmitting the indication in at least one of a sidelink control information (SCI), a physical sidelink shared channel (PSSCH), or a physical sidelink feedback channel (PSFCH).

Aspect 37: The method of Aspect 35, wherein transmitting the indication comprises transmitting the indication via a primary SL CC different from the SL CC.

Aspect 38: The method of Aspect 35, further comprising: transmitting, to a third UE, another indication that the first UE will put the SL CC into the dormant state; receiving another ACK of the other indication from the third UE; and refraining from putting the SL CC into the dormant state until after receiving the ACK and the other ACK.

Aspect 39: A method for wireless communication by a first user equipment (UE), comprising: receiving an indication that a second UE will put a sidelink (SL) component carrier (CC) into a dormant state; and transmitting an acknowledgment (ACK) of the indication.

Aspect 40: The method of Aspect 39, further comprising: refraining from transmitting a control channel via the SL CC to the first second UE, subsequent to transmitting the ACK.

Aspect 41: The method of one of Aspects 39-40, wherein: receiving the indication comprises receiving the indication from a base station (BS); and the ACK is transmitted to the BS.

Aspect 42: The method of one of Aspects 39-41, wherein: receiving the indication comprises receiving the indication from the second UE; and the ACK is transmitted to the second UE.

Aspect 43: The method of Aspect 42, wherein receiving the indication comprises receiving the indication in at least one of a sidelink control information (SCI), a physical sidelink shared channel (PSSCH), or a physical sidelink feedback channel (PSFCH).

Aspect 44: The method of Aspect 42, wherein receiving the indication comprises receiving the indication via a primary SL CC different from the SL CC.

Aspect 45: A method for wireless communication by a base station (BS), comprising: receiving an indication that a first user equipment (UE) will put a sidelink (SL) component carrier (CC) into a dormant state; and transmitting an acknowledgment (ACK) of the indication.

Aspect 46: The method of Aspect 45, further comprising: transmitting, to a second UE, another indication that the first UE will put the SL CC into the dormant state; and receiving another ACK of the other indication from the second UE.

Aspect 47: The method of Aspect 46, wherein the BS refrains from transmitting the ACK until after the BS receives the other ACK.

Aspect 48: An apparatus for wireless communications, comprising means for performing one or more of the methods of Aspects 31-47.

Aspect 49: An apparatus for wireless communications, comprising: a memory; and a processor coupled to the memory, the memory and the processor configured to perform the method of one or more of Aspects 31-47.

Aspect 50: A computer-readable medium, the medium including instructions that, when executed by a processing system, cause the processing system to perform the method of one or more of Aspects 31-47.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus of a user equipment (UE) for wireless communication, comprising:
   memory; and
   one or more processors coupled with the memory, the one or more processors, individually or collectively, being configured to:
   receive an indication to put a first group of component carriers (CCs) including a first component carrier (CC) into dormancy by receiving a physical downlink control channel (PDCCH) via a primary CC, wherein the first CC comprises a CC for a secondary cell (SCell);
   determine a sidelink (SL) CC that corresponds to the CC for the SCell;
   receive a signal indicating a correspondence between the SL CC and the CC for the SCell; and
   put the SL CC into a dormant state in response to the indication.

2. The apparatus of claim 1, wherein the one or more processors, individually or collectively, are further configured to:
   refrain from decoding a control channel transmitted via the SL CC, when the SL CC is in the dormant state.

3. The apparatus of claim 1, wherein the indication is received in a control message from a network entity, and wherein the control message does not affect a configuration of the SCell for the UE.

4. The apparatus of claim 3, wherein the first group of CCs includes the SL CC.

5. The apparatus of claim 1, wherein the one or more processors, individually or collectively, are further configured to receive the indication by receiving another indication to put the SL CC into the dormant state.

6. A network entity for wireless communications, comprising:
   memory; and
   one or more processors coupled with the memory, the one or more processors, individually or collectively, being configured to:
   transmit an indication to a user equipment (UE) to put a first group of component carriers (CCs) including a first component carrier (CC) into dormancy by transmitting a physical downlink control channel (PDCCH) via a primary CC, wherein the first CC comprises a CC for a secondary cell (SCell);

determine a sidelink (SL) CC that corresponds to the CC for the SCell;

transmit a signal indicating a correspondence between the SL CC and the CC for the SCell; and determine that the UE put the SL CC into a dormant state in response to the indication.

7. The network entity of claim 6, wherein the indication is transmitted in a control message to the UE, wherein the control message does not affect a configuration of the SCell for the UE.

8. The network entity of claim 7, wherein the first group of CCs includes the SL CC.

9. The network entity of claim 6, wherein the one or more processors, individually or collectively, are further configured to:

notify at least one other UE that the UE put the SL CC into the dormant state.

10. The network entity of claim 6, wherein the one or more processors, individually or collectively, are further configured to:

transmit the indication by transmitting another indication to put the SL CC into the dormant state.

11. The network entity of claim 6, wherein the determination is based on receiving an acknowledgment (ACK) from the UE.

12. An apparatus of a first user equipment (UE) for wireless communication, comprising:

memory; and one or more processors coupled with the memory, the one or more processors, individually or collectively, being configured to:

transmit, to a second UE, an indication that the first UE will put a group of sidelink (SL) component carriers (CCs) including a first SL component carrier (CC) into a dormant state by transmitting a physical downlink control channel (PDCCH) via a primary CC;

receive, from the second UE, an acknowledgment (ACK) of the indication;

transmit, to a third UE, another indication that the first UE will put the group of SL CCs into the dormant state;

receive another ACK of the other indication from the third UE; and refrain from putting the group of SL CCs into the dormant state until after receiving the ACK and the other ACK.

13. The apparatus of claim 12, wherein the one or more processors, individually or collectively, are further configured to:

refrain from decoding a control channel transmitted via the first SL CC, when the first SL CC is in the dormant state.

14. The apparatus of claim 12, wherein the one or more processors, individually or collectively, are further configured to:

transmit the indication by transmitting the indication to a network entity, wherein the ACK is received from the network entity.

15. The apparatus of claim 12, wherein the one or more processors, individually or collectively, are further configured to:

transmit the indication by transmitting the indication in at least one of a sidelink control information (SCI), a physical sidelink shared channel (PSSCH), or a physical sidelink feedback channel (PSFCH).

16. The apparatus of claim 12, wherein transmitting the indication comprises the transmitting the indication via a primary SL CC different from the first SL CC.

17. An apparatus of a first user equipment (UE) for wireless communication, comprising:

memory; and one or more processors coupled with the memory, the one or more processors, individually or collectively, being configured to:

receive an indication that a second UE will put a group of sidelink (SL) component carriers (CCs) including a first SL component carrier (CC) into a dormant state by receiving a physical downlink control channel (PDCCH) via a primary CC;

transmit an acknowledgment (ACK) of the indication;

transmit, to the second UE, another indication that the first UE will put the group of SL CCs into the dormant state;

receive another ACK of the other indication from the second UE; and refrain from transmitting the ACK until after the first UE receives the other ACK.

* * * * *